United States Patent
Fleming, Jr. et al.

(10) Patent No.: US 9,341,408 B2
(45) Date of Patent: May 17, 2016

(54) SCRUBBER SYSTEM WITH MOVING ADSORBENT BED

(75) Inventors: Malcolm N. Fleming, Jr., Syracuse, NY (US); Catherine Thibaud-Erkey, South Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 133 days.

(21) Appl. No.: 14/233,179

(22) PCT Filed: Jul. 11, 2012

(86) PCT No.: PCT/US2012/046139
§ 371 (c)(1),
(2), (4) Date: Jan. 16, 2014

(87) PCT Pub. No.: WO2013/012621
PCT Pub. Date: Jan. 24, 2013

(65) Prior Publication Data
US 2014/0137598 A1    May 22, 2014

Related U.S. Application Data

(60) Provisional application No. 61/508,872, filed on Jul. 18, 2011.

(51) Int. Cl.
*B01D 53/02* (2006.01)
*F25J 3/08* (2006.01)
(Continued)

(52) U.S. Cl.
CPC . *F25J 3/08* (2013.01); *A23B 7/148* (2013.01); *A23L 3/3418* (2013.01); *B01D 53/06* (2013.01);
(Continued)

(58) Field of Classification Search
CPC ............ A23B 7/148; A23L 3/3418; B01D 2253/102; B01D 2253/108; B01D 2253/204; B01D 2257/504; B01D 2257/7022; B01D 2259/4566; B01D 53/0462; B01D 53/047; B01D 53/06; F25D 17/042; F25D 2317/041; F25J 3/08; Y02C 10/08
See application file for complete search history.

(56) References Cited

U.S. PATENT DOCUMENTS 3,713,273 A    1/1973    Coffee
3,795,749 A    3/1974    Cummin et al.
(Continued)

FOREIGN PATENT DOCUMENTS

EP    0565827 A1    10/1993
FR    2523472 A3    9/1983
(Continued)

OTHER PUBLICATIONS

Singapore Search Report for application 2014003081, dated Mar. 2, 2015, 11 pages.
(Continued)

*Primary Examiner* — Christopher P Jones
(74) *Attorney, Agent, or Firm* — Cantor Colburn LLP

(57) ABSTRACT

A regenerative carbon dioxide removal system (38) is provided onboard the container (10) through which air from within the cargo box (12) may be circulated for removing at least a portion of the carbon dioxide present in the air. The regenerative carbon dioxide removal system (38) includes a scrubber module (40) containing a carbon dioxide absorbent material (42), and an actuator (50) for moving the scrubber module (40) to pass the carbon dioxide absorbent material (42) alternately between a first flow of air (32) to be cleaned drawn by the evaporator fan (30) from within the cargo box (12), and a second flow of air (44) drawn from an environment outside the cargo box for regenerating the carbon dioxide adsorbent material (42) by removing collected carbon dioxide from the carbon dioxide adsorbent material (42).

14 Claims, 9 Drawing Sheets

(51) Int. Cl.

| | | |
|---|---|---|
| *A23L 3/3418* | (2006.01) | |
| *A23B 7/148* | (2006.01) | |
| B01D 53/06 | (2006.01) | |
| F25D 17/04 | (2006.01) | |
| *B01D 53/04* | (2006.01) | |
| *B01D 53/047* | (2006.01) | |

(52) U.S. Cl.
CPC ............ *F25D 17/042* (2013.01); *B01D 53/047* (2013.01); *B01D 53/0462* (2013.01); *B01D 2253/102* (2013.01); *B01D 2253/108* (2013.01); *B01D 2253/204* (2013.01); *B01D 2257/504* (2013.01); *B01D 2257/7022* (2013.01); *B01D 2259/4566* (2013.01); *F25D 2317/041* (2013.01); *Y02C 10/08* (2013.01)

(56) References Cited

U.S. PATENT DOCUMENTS

| | | |
|---|---|---|
| 3,798,333 A | 3/1974 | Cummin et al. |
| 4,292,661 A | 9/1981 | Johnson et al. |
| 4,303,009 A | 12/1981 | La Monica |
| 4,638,641 A | 1/1987 | Taylor |
| 4,701,189 A | 10/1987 | Oliker |
| 5,065,587 A | 11/1991 | Howland et al. |
| 5,419,688 A | 5/1995 | Basinski et al. |
| 5,438,841 A | 8/1995 | Cahill-O'Brien et al. |
| 5,451,248 A | 9/1995 | Sadkowski et al. |
| 5,457,963 A | 10/1995 | Cahill-O'Brien et al. |
| 5,507,539 A | 4/1996 | Basinski |
| 5,515,693 A | 5/1996 | Cahill-O'Brien et al. |
| 5,515,769 A | 5/1996 | Basinski et al. |
| 5,520,720 A | 5/1996 | Lemcoff |
| 5,564,287 A | 10/1996 | Hearne, Jr. et al. |
| 5,795,370 A | 8/1998 | Garrett et al. |
| 5,807,423 A | 9/1998 | Lemcoff |
| 5,814,130 A | 9/1998 | Lemcoff et al. |
| 5,876,488 A | 3/1999 | Birbara et al. |
| 6,013,293 A | 1/2000 | De Moor |
| 6,364,938 B1 | 4/2002 | Birbara et al. |
| 6,460,352 B1 | 10/2002 | Lemcoff et al. |
| 6,543,244 B1 | 4/2003 | Amr |
| 6,755,892 B2 | 6/2004 | Nalette et al. |
| 7,043,927 B2 | 5/2006 | Burchill et al. |
| 7,080,521 B2 | 7/2006 | Ludwig et al. |
| 7,089,933 B2 | 8/2006 | Goldblatt et al. |
| 7,665,314 B2 | 2/2010 | Senf, Jr. et al. |
| 7,736,416 B2 | 6/2010 | Nalette et al. |
| 2002/0035924 A1* | 3/2002 | Keefer ............... B01D 53/0431 95/113 |
| 2003/0209142 A1* | 11/2003 | Schimkat ............ B01D 53/06 95/113 |
| 2004/0035553 A1 | 2/2004 | Bosher et al. |
| 2005/0211099 A1 | 9/2005 | Doughty et al. |
| 2009/0217689 A1 | 9/2009 | Chakiachvili et al. |
| 2010/0107661 A1 | 5/2010 | Awwad et al. |
| 2010/0136443 A1* | 6/2010 | Vincitore ............. C01B 3/384 429/423 |

FOREIGN PATENT DOCUMENTS

| | | |
|---|---|---|
| WO | 9522729 A1 | 8/1995 |
| WO | 2004107868 A1 | 12/2004 |
| WO | 2007033668 A1 | 3/2007 |
| WO | 2008017307 A1 | 2/2008 |

OTHER PUBLICATIONS

Transmittal of International Preliminary Report on Patentability and Written Opinion of the International Searching Authority for International Application No. PCT/US2012/046139, Jan. 30, 2014, 11 pages.

* cited by examiner

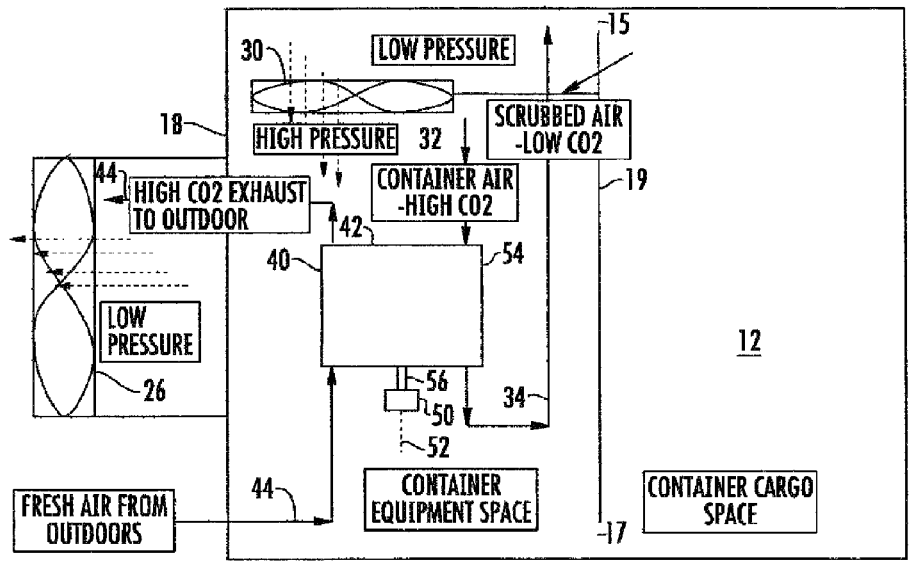
FIG. 3
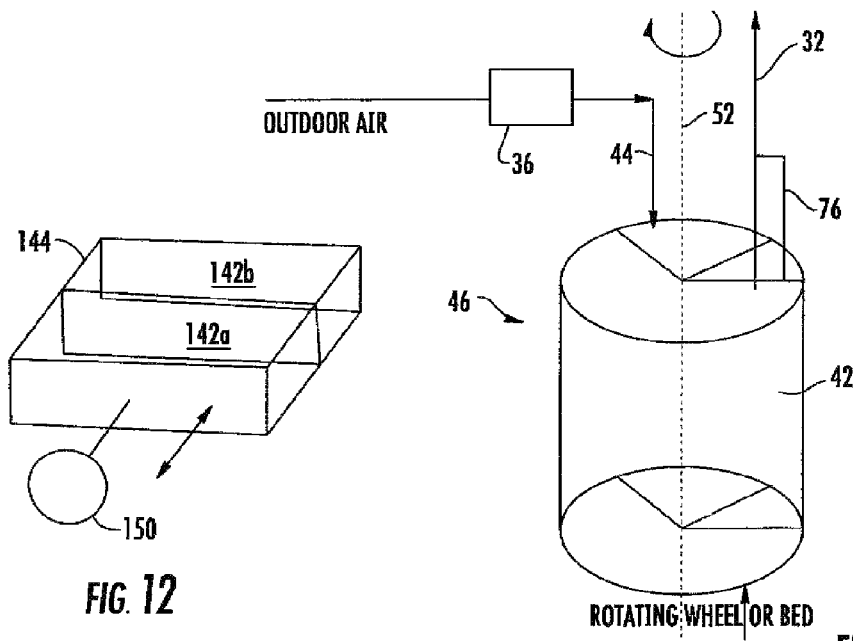
FIG. 12
FIG. 7

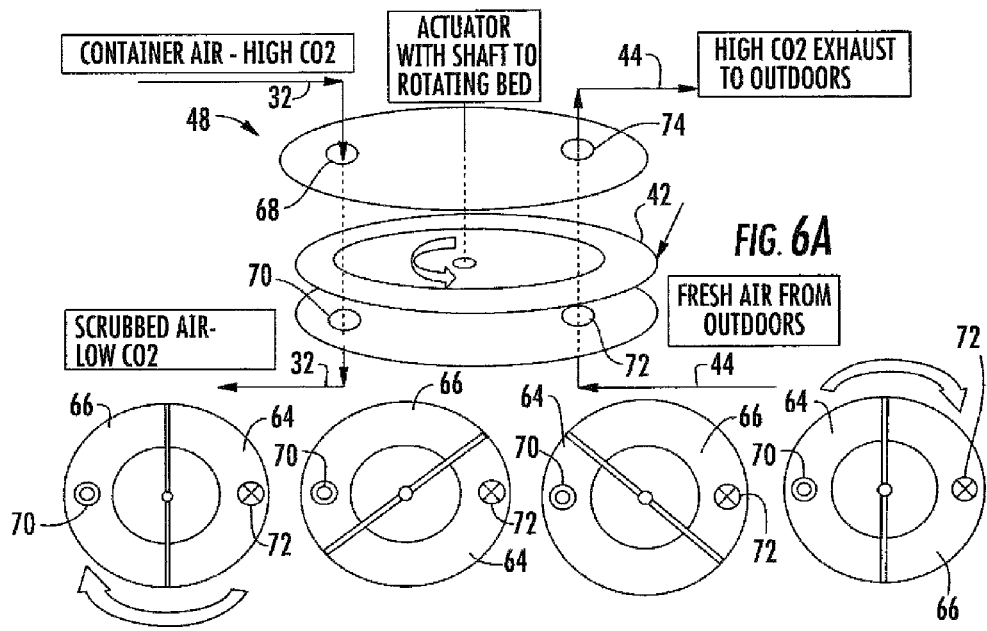
FIG. 6A
FIG. 6B
FIG. 6C
FIG. 6D
FIG. 6E
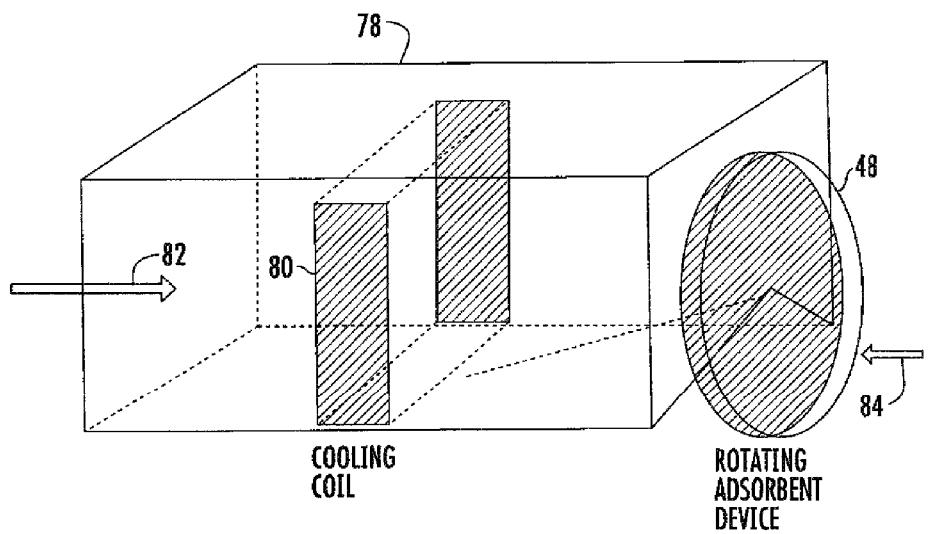
FIG. 8

SCRUBBER SYSTEM WITH MOVING ADSORBENT BED

CROSS-REFERENCE TO RELATED APPLICATION

Reference is made to and this application claims priority from and the benefit of U.S. Provisional Application Ser. No. 61/508,872, filed Jul. 18, 2011, and entitled SCRUBBER SYSTEM WITH MOVING ADSORBENT BED.

BACKGROUND OF THE INVENTION

This invention relates generally to controlling the composition of the atmosphere within a closed environment and, more particularly to the removal of carbon dioxide, and optionally other byproduct of gases from the respiration of fresh produce, from an atmosphere within a closed environment, such as the cargo box of a refrigerated transport container.

Perishable goods are commonly transported in a controlled environment within an enclosed space such as a cargo box of a truck, trailer, sea container, or intermodal container. A refrigeration system, also known as a transport refrigeration system, is used in operative association with the enclosed space within the cargo box for controlling the temperature of the air within the enclosed space. The refrigeration system is operative to maintain the air temperature within the enclosed space within a desired temperature range selected for the particular type of perishable goods stowed within the cargo box. The refrigeration system includes a refrigeration unit including a refrigerant compressor and condenser disposed externally of the cargo box and an evaporator disposed in operative association with the enclosed space of the cargo box. The compressor, condenser and evaporator are connected in a refrigerant circuit in series refrigerant flow relationship in a refrigeration cycle. When the refrigeration system is operating, air is drawn from within the enclosed space by a fan or fans associated with the evaporator, passed through an evaporator disposed within the enclosed space in heat exchange relationship with the refrigerant circulating through the refrigerant circuit to be cooled, and cooled air is then supplied back to the enclosed space.

Certain perishable produce, such as fresh fruits, vegetables and flowers, produce carbon dioxide as a product of the respiration process. In a closed environment, due to post harvest respiration, the carbon dioxide concentration rises and the oxygen concentration drops in the atmosphere within the closed environment. If the oxygen concentration gets too low or the carbon dioxide concentration gets too high, the produce can spoil. Additionally, certain fruits and vegetables and flowers release ethylene and/or ethylene compounds as a byproduct of the ripening process. The presence of ethylene based gases within the enclosed space of the cargo box is known to accelerate the ripening process.

To alleviate these conditions, it is known to introduce fresh air into the closed environment within the cargo box, while simultaneously venting overboard air from the closed environment within the cargo box. Various air exchange systems are available for use in connection with the transport of perishable cargo. For example, U.S. Pat. No. 6,763,677 discloses a manually operated fresh air vent associated with a refrigerated transport container for providing fresh air to the circulating air and exhausting a portion of the circulating air exteriorly of the cargo box of the container.

It is also known in the art to delay ripening of a perishable produce in transit within a container or other enclosed cargo storage space by providing a controlled atmosphere within the enclosed cargo storage space. Typically, a high nitrogen, low oxygen atmosphere is provided by either replacing the atmospheric air within the enclosed cargo storage space with nitrogen gas prior to shipment or displacing the atmospheric air within nitrogen generated by an onboard system that extracts nitrogen from the ambient air. The former approach may be suitable for well sealed containers over a short haul, but inadequate for long haul transport of perishable produce. The latter approach is generally considered more suitable for longer haul transport of perishable produce, but requires higher capital costs, as well as higher operating costs.

It is also known to remove carbon dioxide from the atmosphere within an enclosed space by passing the gas from within the enclosed space through a non-regenerative bed of carbon dioxide adsorbent to scrub carbon dioxide from the gas passing through the adsorbent bed. However non-regenerative systems lose scrubbing efficiency as the adsorbent bed becomes saturated and the carbon dioxide adsorbent material must be replaced. Therefore, such non-regenerative systems have limited application, particularly in the long haul transport of perishable produce.

SUMMARY OF THE INVENTION

A regenerative carbon dioxide removal system is provided onboard the container through which air from within the cargo box may be circulated for removing at least a portion of the carbon dioxide present in the air. The regenerative carbon dioxide removal system includes a scrubber module containing a carbon dioxide adsorbent material, and an actuator for moving the scrubber module to pass the carbon dioxide adsorbent material alternately between a first flow of air to be cleaned drawn by the evaporator fan from within the cargo box, and a second flow of air drawn from an environment outside the cargo box for regenerating the carbon dioxide adsorbent material by removing collected carbon dioxide from the carbon dioxide adsorbent material.

A method is provided for controlling the concentration of carbon dioxide in a gaseous atmosphere within a closed environment to maintain the concentration of carbon dioxide in the gaseous atmosphere within the closed environment at a desired level, the method including the step of passing a carbon dioxide adsorbent material alternately between a first flow of air to be cleaned drawn by the evaporator fan from within the cargo box, and a second flow of air drawn from an environment outside the cargo box for regenerating the carbon dioxide adsorbent material by removing collected carbon dioxide from the carbon dioxide adsorbent material.

BRIEF DESCRIPTION OF THE DRAWINGS

For a further understanding of the disclosure, reference will be made to the following detailed description which is to be read in connection with the accompanying drawing, wherein:

FIG. 3 is a schematic representation of a third exemplary embodiment of a refrigerated transport container equipped with an air scrubber system including a rotating scrubber module;

FIG. 6 is a diagram illustrating a rotating disc embodiment of the rotating scrubber module disclosed herein and showing four stages of rotation of the disc as viewed from below;

FIG. 7 is a perspective view of a further embodiment of the rotating scrubber system disclosed herein including a cooling air flow stream passing through the bed of adsorbent material;

FIG. 8 is a diagrammatic illustration of an embodiment of the rotating scrubber system wherein the rotating disc of adsorbent material is disposed downstream of a cooling coil with respect to the flow of air to be cleaned;

FIG. 11 is a schematic representation of the sliding drawer scrubber module of FIG. 9 translated to a second position; and FIG. 12 is a diagrammatic illustration, in perspective view, of an embodiment of a sliding drawer and actuator of the sliding drawer scrubber module as disclosed herein.

DETAILED DESCRIPTION OF THE INVENTION

Figure 1:
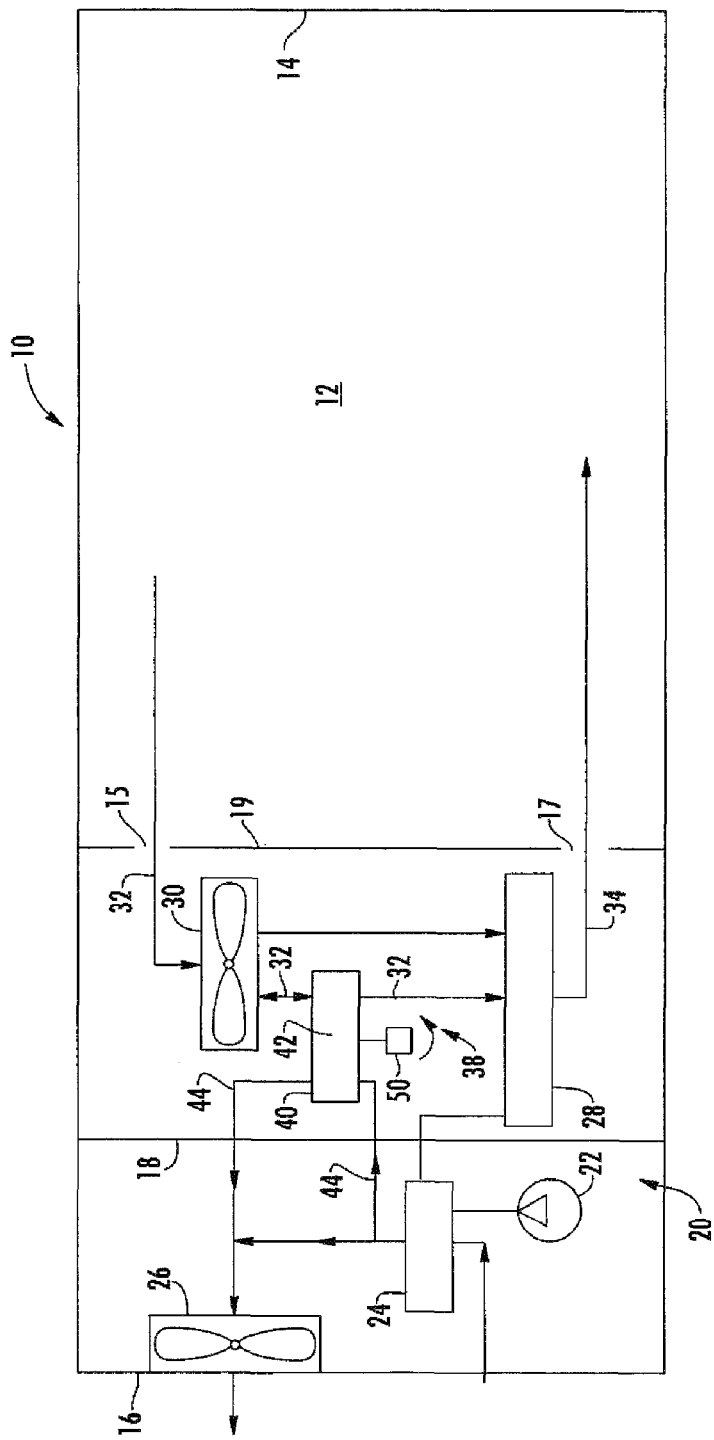
FIG. 1 is a schematic representation of an exemplary embodiment of a refrigerated transport container equipped with an air scrubber system including a rotating scrubber module.
Figure 2:
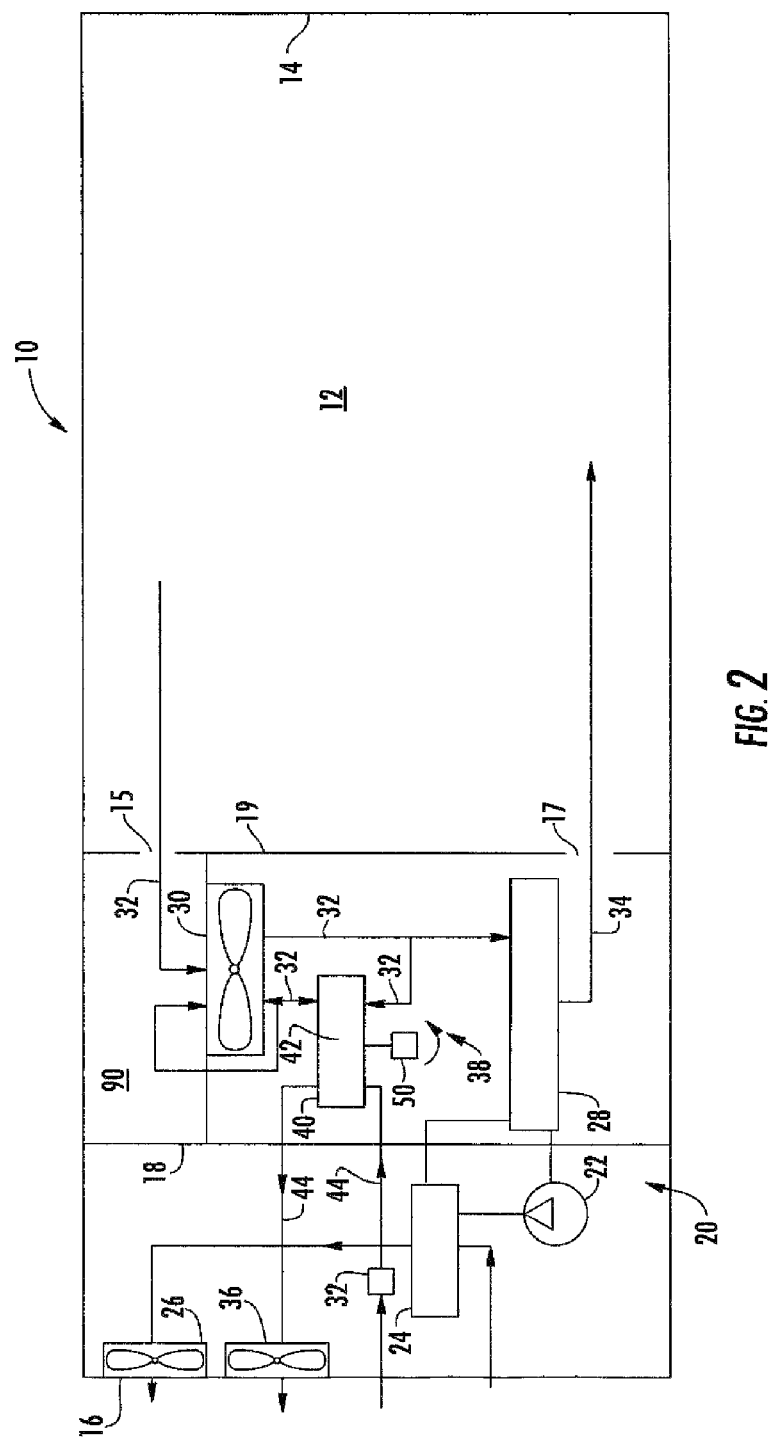
FIG. 2 is a schematic representation of a second exemplary embodiment of a refrigerated transport container equipped with an air scrubber system including a rotating scrubber module.
Figure 9:
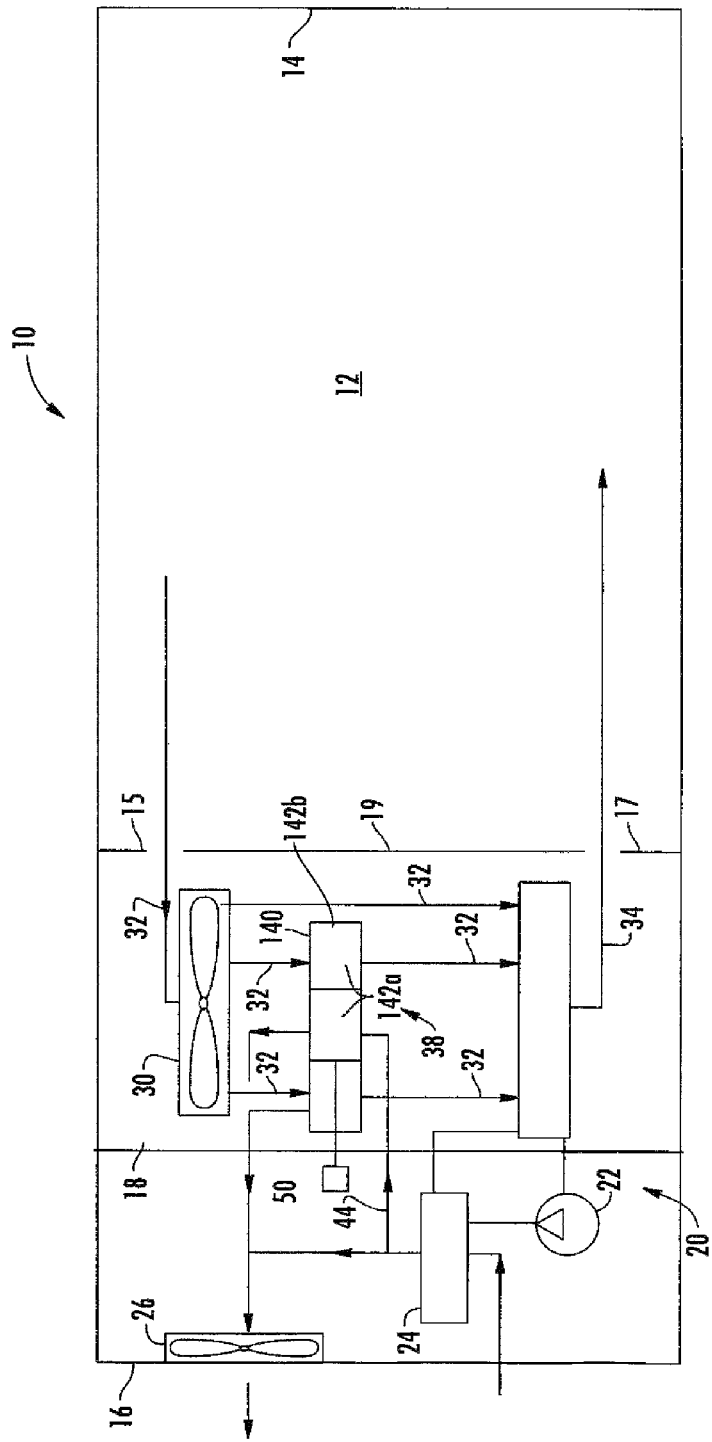
FIG. 9 is a schematic representation of an exemplary embodiment of a refrigerated transport container equipped with an air scrubber system including a sliding drawer scrubber module having first and second adsorbent beds.

Referring initially to FIGS. 1, 2 and 9 of the drawing, there is depicted schematically an exemplary embodiment of a refrigerated cargo container, generally referenced 10, equipped with a transport refrigeration unit 20. The container 10 defines a closed environment that serves as a cargo space 12, referred to herein as the cargo box, wherein bins, cartons or pallets of cargo (not shown) such as, for example, but not limited to fresh produce, are stacked for transport. The rear wall 14 is provided with one or more doors (not shown) through which access to the cargo box may be had for loading the cargo into the container 10. When the doors are closed, a substantially air-tight, sealed cargo box is established within the container 10 which, to a substantial extent, prevents inside air from escaping and outside penetrating into the cargo box 12.

The transport refrigeration unit 20 is mounted to a wall of the container 10, typically being received in an opening in the forward wall 16 of the container 10 for conditioning the air within the refrigerated closed environment of the cargo box 12. The transport refrigeration unit 20 includes a compressor 22 and a condenser/gas cooler module isolated from the cargo box 12 by a partition wall 18, and an evaporator module in air flow communication with the cargo box 12 through a return air opening 15 and a supply air opening 17 in a back panel 19 of the transport refrigeration unit 20 that also forms a front wall of the cargo box 12.

The condenser/gas cooler module includes a condenser/gas cooler heat exchanger 24, which functions as a refrigerant heat rejection heat exchanger, mounted in the forward section of the transport refrigeration unit 20 external to the cargo box 12 and positioned in association with one or more condenser/gas cooler fans 26 for drawing ambient air from outside the cargo box 12, typically through an opening at the lower front of the transport refrigeration unit 20, thence passing that air through the condenser/gas cooler heat exchanger 24 and exhausting that air back into the environment outside the cargo box 12. The evaporator module includes an evaporator heat exchanger 28, which constitutes a refrigerant heat absorption heat exchanger, and one or more evaporator fans 30 that draw air 32 from the cargo box 12 through return air opening 15 to pass through the evaporator heat exchanger 28. The conditioned air 34 is thereafter supplied back into the cargo box 12 of the container 10 through supply air opening 17. The compressor 22, the condenser/gas cooler heat exchanger 24 and the evaporator heat exchanger 28 are disposed in a conventional manner in a refrigerant circuit in a conventional refrigeration cycle arrangement whereby the circulating air is cooled when passing through the evaporator heat exchanger 28 in heat exchange relationship with the refrigerant.

Although the closed environment of the cargo box 12 is substantially air-tight, when freshly harvested produce, such as fruits, vegetables and flowers, are stowed in the cargo box 12, the composition of the atmosphere within the closed environment will change due to respiration by the produce. More specifically, the concentration of carbon dioxide will rise and the concentration of oxygen will fall as the produce ripens. Additionally, ethylene will be produced as a product of the respiration of fresh produce. As ethylene accelerates ripening, the increase of ethylene is undesirable, particularly for long haul transmit. Thus, the term "box air" as used herein refers to the atmosphere within the closed environment of the cargo box irrespective of the gaseous composition of the atmosphere.

A regenerative carbon dioxide removal system 38 is provided onboard the container 10 through which air from within the cargo box 12 may be circulated for removing at least a portion of the carbon dioxide present in the air. The regenerative carbon dioxide removal system 38 includes a scrubber module 40 containing a carbon dioxide adsorbent material 42, and an actuator 50 for moving the scrubber module 40 to pass the carbon dioxide adsorbent material 42 alternately between a first flow of air 32 to be cleaned drawn by the evaporator fan 30 from within the cargo box 12, and from which carbon dioxide is to be removed, and a second flow of air from an environment outside the cargo box 12 for regenerating the carbon dioxide adsorbent material 42 by removing collected carbon dioxide from the carbon dioxide adsorbent material 42.

In the embodiments depicted in FIGS. 1-8, the scrubber module 40 comprises a rotating module 46 housing the carbon dioxide adsorbent material 42 and the actuator 50 comprises a device for rotating the module 46 about an axis of rotation 52, for example a vertically extending axis or a horizontally extending axis, and through the air flow to be cleaned and the regeneration air flow. In the embodiments depicted in FIGS. 9-11, the scrubber module 40 comprises a sliding module 48 having a first section 47 and a second section 49 and the actuator 50 comprises a device for translating the sliding module 48 forward and backward through the air flow to be cleaned and the regeneration air flow. In each of these embodiments, while one portion of the carbon dioxide adsorbent material 42 is exposed to the higher carbon dioxide concentration air flow, i.e. the flow of circulating air drawn from within the cargo box 12, and therefore collecting carbon dioxide, another portion of the carbon dioxide adsorbent material 42 is exposed to the lower carbon dioxide concentration air flow, i.e. the flow of regeneration air from outside the cargo box 12, and therefore releasing previously adsorbed carbon dioxide.

The regenerative carbon dioxide adsorbent material 42 may itself comprise a material that will also adsorb ethylene or may be mixed with an adsorbent that is specific for adsorbing ethylene. It is to be understood that the term "regenerative" means that the efficiency of removal of carbon dioxide, or carbon dioxide and ethylene, can be maintained by desorbing adsorbed carbon dioxide from the adsorbent material. Due to this regenerative characteristic, the regenerative carbon dioxide adsorbent is suitable for use in accordance with the method disclosed herein over the time span of several days or even weeks during the long haul transport of fresh produce. In an embodiment, the regenerative carbon dioxide adsorbent 42 consists essentially of activated carbon. In an embodiment, the regenerative carbon dioxide adsorbent consists essentially of metal organic frameworks. In an embodiment, the regenerative carbon dioxide adsorbent consists of a structured material such as carbon fibers or carbon monolith. In an embodiment, the regenerative carbon dioxide adsorbent consists essentially of zeolite. In an embodiment, the regenerative carbon dioxide adsorbent comprises a mixture of activated carbon and at least one other active adsorbent material, such as, for example, but not limited to zeolite.

In refrigerated transport applications, onboard fans 26, 30 associated with the transport refrigerant unit 20 may provide the force for moving the respective air flows to scrubber module 40 and through the regenerative carbon dioxide adsorbent material 42. The evaporator fan(s) 30 may be used to pass a portion, typically less than 10%, of the circulating box air flow from the cargo box 12 through that portion of the carbon dioxide adsorption material in an adsorption mode, and thence supply the scrubbed box air back to the cargo space 12. For example, in the forced flow arrangement depicted in FIGS. 1 and 9, the onboard evaporator fan 30 pushes a portion of the circulating box air through the scrubber module 40. In the push-pull flow arrangement depicted in FIG. 2, higher pressure air from downstream of the evaporator fan 30 enters the scrubber nodule 40 and exhausts into the lower pressure plenum on the upstream side of the evaporator fan 30.

The condenser/gas cooler fan 26 may be used to pass air from outside the cargo box 12 through that portion of the carbon dioxide adsorbent material in a regeneration mode, and thence exhaust the carbon dioxide laden regeneration air overboard back into the atmosphere outside the cargo box 12. In the embodiments depicted in FIGS. 1 and 9, the regeneration air flow 44 comprises condenser/gas cooler exhaust air flow that is ambient air flow having passed through the condenser/gas cooler heat exchanger 24. In the embodiments depicted in FIGS. 3, 10 and 11, the regeneration air flow comprises ambient air flow drawn from the environment outside the cargo box 12 and not having passed through the condenser/gas cooler heat exchanger 24. However, as depicted in FIG. 2, a dedicated fan 36 separate from the condenser/gas cooler fan 26 may be provided when desired. For example, it may be desirable to employ a dedicated fan for moving the regeneration air flow when pressure drop may exceed the capability of the condenser/gas cooler fan 26, or in the event that it is not desired to run the condenser/gas cooler fan 26 during periods when the compressor 22 is not in operation.

The regeneration air may be ambient temperature air or may be ambient air having been heated. In the embodiments depicted in FIGS. 1 and 9 wherein the regeneration air 44 comprises exhaust air from condenser/gas cooler heat exchanger, the ambient air has been preheated by passing in heat exchange relationship with a hot refrigerant vapor. However, as depicted in FIG. 2. a separate dedicated heater 37 may be provided for preheating the ambient air. The heater 37 may, for example, be an electric heater or a heating coil through a heating fluid passes. The heating fluid may for example, be engine exhaust gases if a fossil fuel engine is carried on board the container 10 for powering the transport refrigerant unit 20 or even engine exhaust gas from an engine powering a truck or trailer cab associated with the container 10. In an embodiment, the regeneration air 44 is preheated prior to delivery to the scrubber module 40 to a temperature sufficient to raise the dew point of the regeneration air 44 to avoid condensation of moisture in the air within the scrubber module 40 that is disposed within the cooler evaporator compartment. In an embodiment, the regeneration air 44 is preheated prior to delivery to the scrubber module to a temperature sufficient to increase the efficiency of carbon dioxide release from the carbon dioxide adsorbent material.

Figure 4:
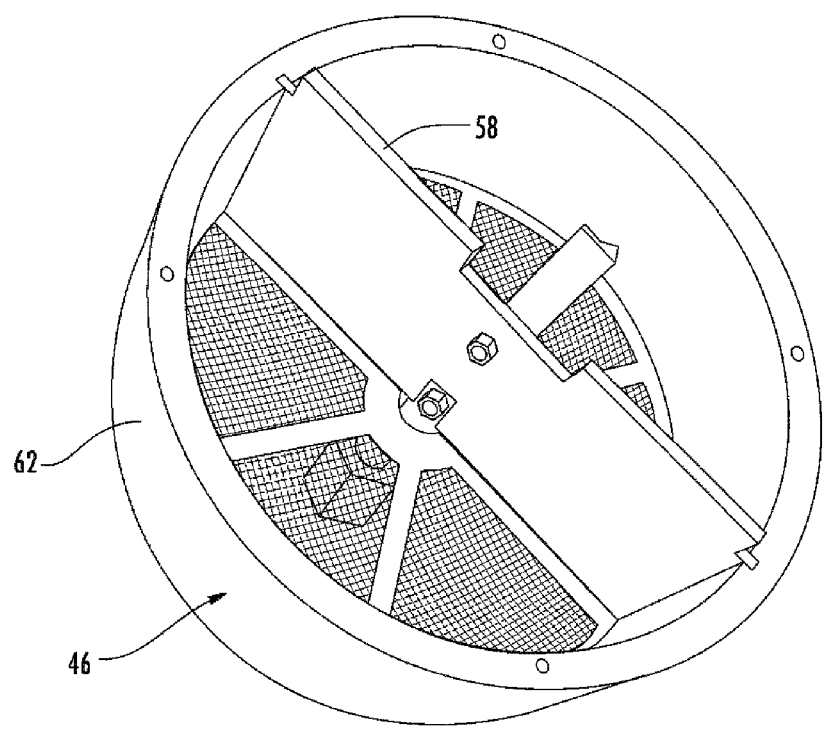
FIG. 4 is a perspective view of an embodiment of a rotating wheel of the rotating scrubber module taken from above.
Figure 5:
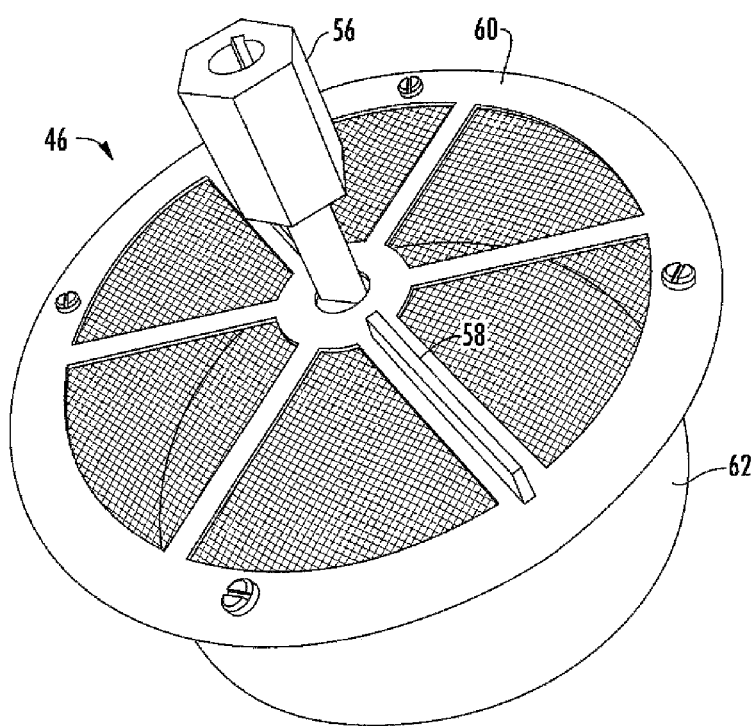
FIG. 5 is a perspective view of the rotating wheel of FIG. 4 taken from below.

Referring to FIGS. 1 and 3-8, in the depicted embodiments, the regenerative scrubber system 38 includes a single rotating scrubber module 40 disposed onboard the refrigerated transport container 10 in association with the evaporator module of the transport refrigeration unit 20. The rotating scrubber module 40 may be disposed within the evaporator module as depicted in FIGS. 1-3. Alternatively, the rotating scrubber module 40 may be mounted in the partition panel 18 such that the adsorption of carbon dioxide from the circulating box air occurs in the evaporator module, but regeneration by removal of the adsorbed carbon dioxide into the regeneration air flow occurs in the condenser module on the forward side of the partition panel 18. The rotating scrubber module 40 includes a cylindrical housing 54 and a rotating wheel or disc 46 disposed within the housing 54. The wheel 46 has a cylindrical body 62 mounted to a shaft 56 and housing the regenerative carbon dioxide adsorbent 42. In the embodiment depicted in FIG. 4, a plate 58 may be provided to extend diametrically across the interior of the wheel 46 to section the interior of the wheel into a first sector and a second sector. As best seen in FIGS. 4 and 5, a screened floor 60 is mounted to the one end of the cylindrical body 62 of the wheel 46. A similar screened cover (not shown in FIGS. 4 and 5) may be mounted to the other end of the cylindrical body 62 of the wheel 46. The carbon dioxide adsorbent material 42 (not shown in FIGS. 4 and 5) is disposed within the interior volume circumscribed by the cylindrical body 62 of the wheel 46. In an embodiment, the carbon dioxide adsorbent material comprises a porous mass of carbon dioxide adsorbent material in the form of a packed bed of particles, extruded pellets, or the like. In other embodiments, the carbon dioxide adsorbent material 42 may be present in other forms, such as for example, but not limited to, a spiral winding of fabric or concentric rings of fabric made from or coated with the carbon dioxide adsorbent material.

In the embodiment illustrated in FIGS. 1 and 3, the scrubber module 40 is disposed in the evaporator section of the container on the high pressure side of the evaporator fan 30 in the flow path of circulating box air. When the evaporator fan 30 is operating, air is drawn from the cargo box 12 through the return air inlet 32 to pass through the evaporator heat exchanger 28 (not shown in FIG. 3) and back to the cargo box 12 through the supply air inlet 34. A portion of this circulating air flow enters the scrubber module 40 through an inlet opening provided in either the top or bottom plate of the housing 54, passes through a portion of the carbon dioxide adsorbent material 42 in the rotating wheel 46, and exits through a duct opening into the housing 54 on the end opposite the inlet opening and discharging into the circulating air flow on the low pressure side of the evaporator fan 30. Simultaneously, a flow of regeneration air 44 is drawn from outside the cargo box 12, passed into an inlet opening provided in either the top or bottom plate of the housing 54, passed through a portion of the carbon dioxide adsorbent material 42 in the rotating wheel 46 to exit the scrubber module 40 through an outlet opening on the other end of the housing 54, and thence exhausted back into the environment outside the cargo box 12.

The respective inlet and outlet openings in the ends of the housing 54 for accommodating the flow of air to be cleaned and flow of regeneration air are disposed in diametrically opposite relationship such that the first and second sectors of the carbon dioxide adsorbent material, which are separated by the division plate 58, are always operating in different modes. Thus, the sector exposed to the air flow drawn from the cargo box 12 to be cleaned is in the adsorption mode, while the sector exposed to the air flow from outside the cargo box 12 is in the regeneration mode. For example, referring now to FIG. 6, wherein in the scrubber module 40 depicted therein a rotating bed 48 of carbon dioxide adsorbent material 42 is disposed in an annular disc 46, rather than in a rotating wheel, the actuator 50 rotates the first and second sectors 64, 66 of the bed of carbon dioxide adsorbent material 42 within the annular disc 46 through the flow of box air 32 drawn from the cargo box 12 and through the flow of regeneration air 44. The flow of box air 32 to be cleaned enters the annular disc 46 through inlet 68 and exits through the outlet 70. The flow of regeneration air 44 enters the annular disc 46 through inlet 72 and exits through outlet 74.

A half revolution of the rotating bed 48 of carbon dioxide adsorbent material 42 through 180 degrees is illustrated in FIGS. 6B through 6E, the half revolution initiated at FIG. 6B and completed at FIG. 6E. At initiation of the illustrated half revolution, the first sector 64 is exposed to the flow of regeneration air 44 and the second sector 66 is exposed to the flow of box air 32. As the actuator 50 rotates the bed 48, the first sector 64 moves from exposure to the flow of regeneration air 44 into exposure to the flow of box air 32 and the second sector 66 moves from exposure to the flow of box air 32 into exposure to the flow of regeneration air 44 as illustrated in going from FIG. 6C to FIG. 6D. At completion of the half revolution, the first sector 64 is exposed to the flow of box air 32 and the second sector 66 is exposed to the flow of regeneration air 44. Thus, in a half revolution, the first sector 64 has moved from the regeneration mode to the adsorption mode, while the second sector 66 has moved from the adsorption mode to the regeneration mode. In the next half revolution, the second sector 66 will move from the regeneration mode to the adsorption mode, while the first sector 64 will move from the adsorption mode to the regeneration mode.

As the regeneration air drawn from outside the cargo box 12 constitutes ambient temperature air or higher temperature heated ambient air is warmer then the box air to be cleaned, the carbon dioxide adsorbent material 42 is heated when passing through the regeneration air during the regenerative mode. In an embodiment of the rotating scrubber system disclosed herein, to improve adsorption efficiency, the carbon dioxide adsorbent material 42 may be passed through a flow of cooling air 76 after passing through the flow of regeneration air 44 and prior to entering the flow of box air 32 to be cleaned. For example, as illustrated in FIG. 7, a portion of the cooler cleaned box air 32 having traversed the carbon dioxide adsorbent material 42 may be passed back through the carbon dioxide adsorbent material 42 to cool the carbon dioxide adsorbent material 42 as the carbon dioxide adsorbent material 42 passes out of the regeneration air flow.

Referring now to FIG. 8, in the arrangement depicted therein, a rotating bed 48 of carbon dioxide adsorbent material is disposed in an air duct 78 downstream of an air cooling coil 80. The floor of the air duct 78 for conveying the air 82 to be cleaned is indented inwardly to accommodate and direct a flow of warmer regeneration air 84 through a portion of the carbon dioxide adsorbent material 42 as the bed rotates. Air 82 to be cleaned passes through the coiling coil 80 prior to passing through the carbon dioxide adsorbent material and is cooled. As the cooled air passes through the bed 48, the cooled air absorbs heat from the carbon dioxide adsorbent material thereby removing the heat transferred to the carbon dioxide adsorbent material when passing through the flow of warmer regeneration air 84. By cooling the carbon dioxide adsorbent material as the bed rotates through the cooled flow of air 82 to be cleaned, the carbon dioxide adsorption efficiency is increased.

A sliding drawer embodiment of the scrubber module disclosed herein is depicted in FIGS. 9-12. The scrubber module 140 includes a sliding drawer 144, depicted in a perspective view in FIG. 12, a stationary housing 146 and an associated push-pull actuator 150. The sliding drawer 144 has a pair of beds 142a, 142b of carbon dioxide adsorbent material 42 disposed in abutting end-to-end relationship within and movable within a stationary housing 146. The push-pull actuator 150 is operatively connected to the housing 146 for selectively translating the sliding drawer 144 to either a forward position or a rearward position. The housing 146 defines three zones including a first adsorption zone 152, a second adsorption zone 154, and a regeneration zone 156 intermediate the first adsorption zone 152 and second adsorption zone 154.

As illustrated in FIG. 9, the sliding drawer scrubber module 140 is disposed within the evaporator module on the high pressure side, which is downstream of, the evaporator fan 30 within the evaporator module. The housing 146 is arranged to receive a first flow of box air 32 drawn from the cargo box 12 into the first adsorption zone 152, to receive a second flow of box air 32 drawn from the cargo box 12 into the second adsorption zone 154, and to receive a flow of regeneration air 44 drawn from outside of the cargo box 12 into the regeneration zone 156.

Figure 10:
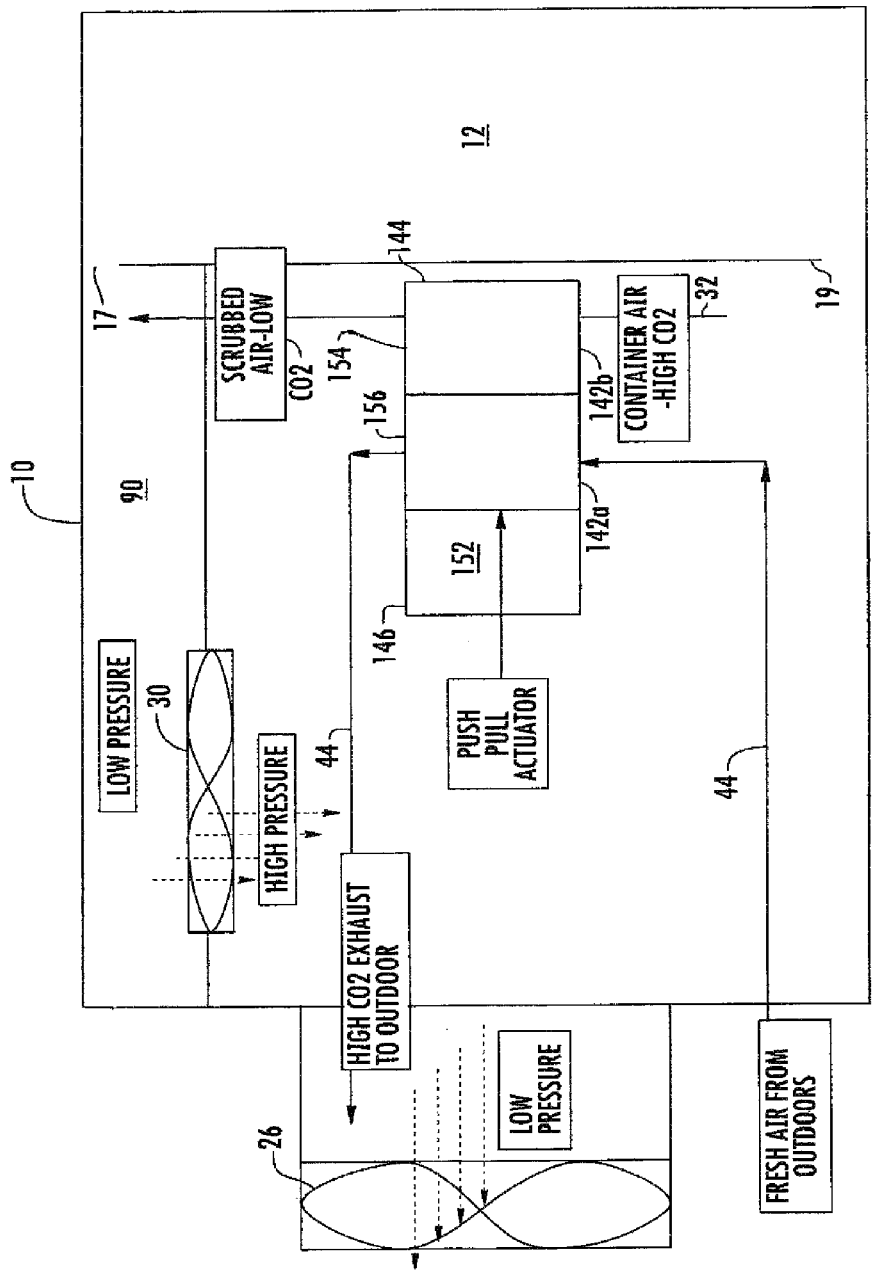
FIG. 10 is a schematic representation of the sliding drawer scrubber module of FIG. 9 translated to a first position.
Figure 17:
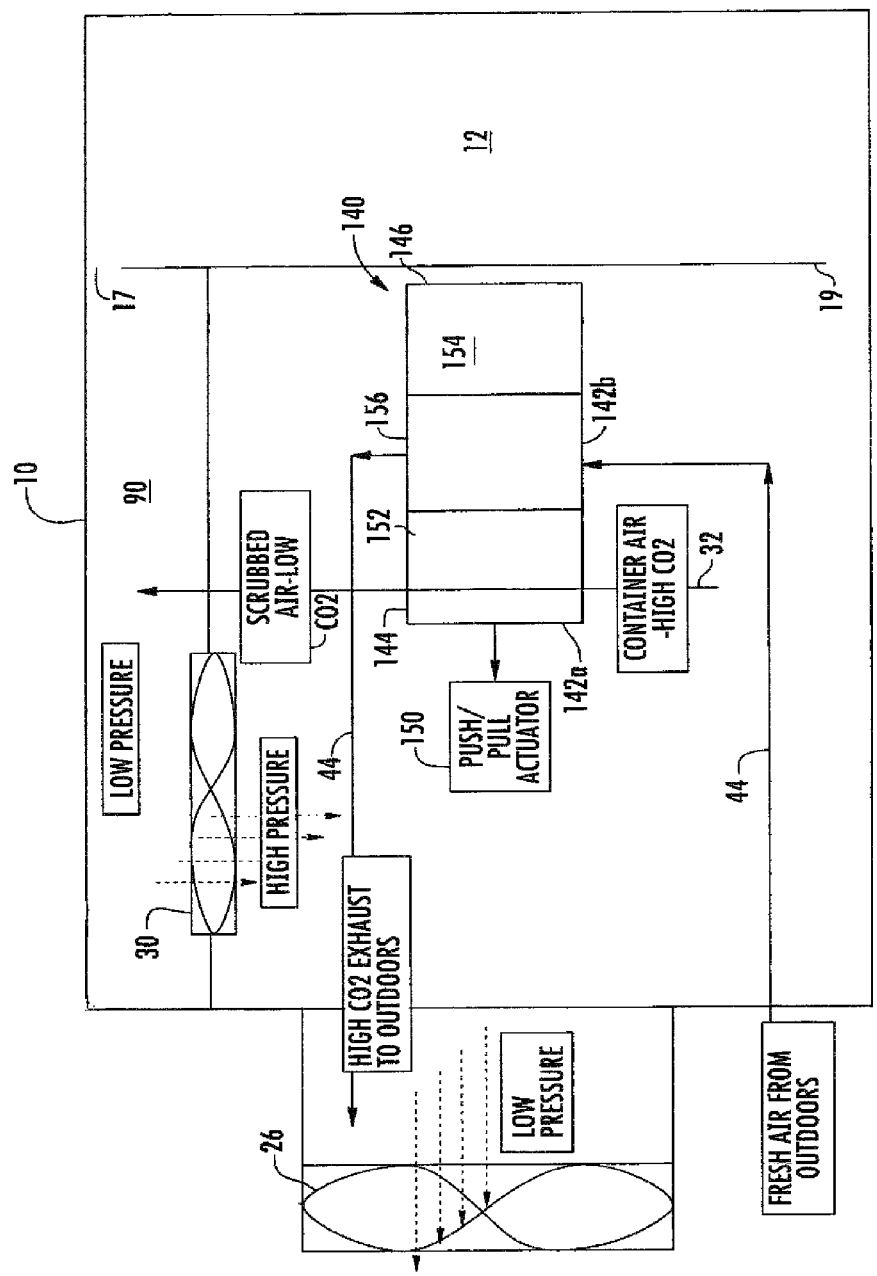

When the sliding drawer 144 is positioned by the actuator 150 in the forward position as depicted in FIG. 10, the bed 142a is disposed within the regeneration zone 156 and the bed 142b is disposed within the second adsorption zone 154. With the sliding drawer 144 so positioned within the housing 146, the bed 142a is exposed to the flow of regeneration air 44 for removing adsorbed carbon dioxide from the carbon dioxide adsorbent material within the bed 142a, and the bed 142b is exposed to a flow of box air 32 to be cleaned for collecting carbon dioxide from the box air 32 passing through the bed 142b disposed within the second adsorption zone 154.

Conversely, when the sliding drawer 144 is positioned by the actuator 150 in the rearward position as depicted in FIG. 11, the bed 142b is disposed within the regeneration zone 156 and the bed 142a is disposed within the first adsorption zone 152. With the sliding drawer 144 so positioned within the housing 146, the bed 142b is exposed to the flow of regeneration air 44 for removing adsorbed carbon dioxide from the carbon dioxide adsorbent material within the bed 142b, and the bed 142a is exposed to a flow of box air 32 to be cleaned for collecting carbon dioxide from the box air 32 passing through the bed 142a disposed within the first adsorption zone 152.

In each of the forward and rearward positions of the sliding drawer 144, the low carbon dioxide content box air 32 having traversed the carbon dioxide adsorbent material passes out of the housing 146 and is ducted to discharge into the low pressure plenum 90 upstream of the evaporator fan 30 to mix with higher carbon dioxide content circulating box air 32 drawn from the cargo box 12 and into the plenum 90 through the return air inlet 17. The high carbon dioxide content regeneration air flow leaving the bed of carbon dioxide adsorbent material disposed within the regeneration zone 156 passes out of the housing 146 and is exhausted back into the environment outside the cargo box 12.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A refrigerated transport container comprising:
   a cargo box;
   a compressor and a condenser/gas cooler module isolated from the cargo box by a partition panel;
   an evaporator module including an evaporator heat exchanger and an associated evaporator fan disposed in air flow communication with the cargo box;
   a regenerative scrubber system for removing carbon dioxide from the atmosphere within the cargo box, the regenerative scrubber system comprising:
   a scrubber module containing a carbon dioxide adsorbent material; and
   an actuator for moving the scrubber module to pass the carbon dioxide adsorbent material alternately between a first flow of air to be cleaned drawn by the evaporator fan from within the cargo box from which carbon dioxide is removed and a second flow of air from an environment outside the cargo box for regenerating the carbon dioxide adsorbent material by removing collected carbon dioxide from the carbon dioxide adsorbent material.

2. The refrigerated transport container as set forth in claim 1 wherein the actuator comprises a rotary actuator for rotating the scrubber module about an axis of rotation through the first flow of air and the second flow of air in sequence.

3. The refrigerated transport container as set forth in claim 2 wherein the scrubber module is mounted in the partition panel separating the condenser/gas cooler module from the evaporator module; and the actuator rotates the scrubber module through the evaporator module and the condenser/gas cooler module.

4. The refrigerated transport container as set forth in claim 2 wherein the scrubber module is disposed in the evaporator module of the refrigeration unit on a high pressure side of the evaporator fan.

5. The refrigerated transport container as set forth in claim 2 wherein the actuator comprises a rotary actuator for rotating the scrubber module about an axis of rotation through the first flow of air and the second flow of air and a third flow of air in sequence, the third flow of air comprising a flow of cooling air.

6. The refrigerated transport container as set forth in claim 1 wherein the scrubber module comprises a rotating wheel mounted to a shaft driven by the rotary actuator and having a body with a screened floor for housing the carbon dioxide adsorbent material.

7. The refrigerated transport container as set forth in claim 6 wherein the carbon dioxide adsorbent material comprises a porous mass of carbon dioxide adsorbent material in the form of a packed bed of particles or extruded pellets.

8. The refrigerated transport container as set forth in claim 6 wherein the carbon dioxide adsorbent material comprises a spiral winding or concentric rings of a fabric made from or coated with the carbon dioxide adsorbent material.

9. The refrigerated transport container as set forth in claim 6 wherein the carbon dioxide adsorbent material further comprises an ethylene adsorbent material.

10. The refrigerated transport container as set forth in claim 1 further comprising a heater for heating the second flow of air.

11. The refrigerated transport container as set forth in claim 10 wherein the heater comprises a heat exchanger wherein the second flow of air passes in heat exchange relationship with a flow of engine exhaust gases.

12. The refrigerated transport container as set forth in claim 1 further comprising a cooling coil for cooling the first flow of air prior to the first flow of air passing through the carbon dioxide adsorbent material.

13. The refrigerated transport container as set forth in claim 1 wherein the actuator comprises a push-pull actuator for translating the scrubber module back and forth between the first flow of air and the second flow of air.

14. The refrigerated transport container as set forth in claim 13 wherein the scrubber module comprises a sliding drawer translatable within a stationary housing and having a first compartment and a second compartment, each compartment housing carbon dioxide adsorbent material, the push-pull actuator operative for translating the sliding drawer to either a forward position or a rearward position within the stationary housing.

* * * * *